United States Patent Office 3,497,575

Patented Feb. 24, 1970

3,497,575

POLYMERS OF PERFLUOROALKYLAMIDO-ALKYLTHIO METHACRYLATES AND ACRYLATES

Eduard K. Kleiner, New York, and Pier Luigi Pacini, Bronxville, N.Y., assignors to Geigy Chemical Corporation, Ardsley, N.Y., a corporation of New York No Drawing. Filed June 30, 1967, Ser. No. 650,171

Int. Cl. C08f 3/64, 3/66

U.S. Cl. 260—900 21 Claims

ABSTRACT OF THE DISCLOSURE

Polymers of perfluoroalkylamido-alkylthio methacrylates and acrylates made from the respective monomers are useful for imparting soil, water and oil repellency properties to textile fabrics. Particularly preferred embodiments are homopolymers of 2-(n-perfluorooctanoamido)ethyl thiomethacrylate, copolymers thereof, and blends of such polymers with other polymers in fabric finishes.

THE INVENTION

This invention relates to novel polymers with soil repellent properties. More particularly it relates to homopolymers and copolymers of (perfluoroalkylamido)-ethyl-thioacrylates and methacrylates. These polymers provide oil- and water-repellent finishes useful to treat materials such as textiles, paper, leather, painted wooden and metallic surfaces, and the like.

The polymers contemplated by the instant invention are made by polymerizing compounds selected from those of the formula:

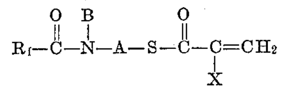

wherein $R_f$ is a perfluorinated alkyl of straight or branched chain of 2 to 18 carbon atoms, preferably 6 to 10 carbon atoms;

A is an alkylene radical of 2 to 6 carbon atoms, preferably 2;

B is hydrogen or a straight or branched chain alkyl of 1 to 4 carbon atoms and preferably hydrogen or methyl; and X is hydrogen or methyl.

The polymers of the present invention are particularly valuable in fabric finishes. Finishes made with the polymers of the present invention are fast to repeated washes and dry-cleanings. Thus fabrics treated with such finishes maintain their soil repellency for long durations.

Particularly preferred embodiments of the present invention are polymers of the compound 2-(n-perfluorooctanoamido)ethyl-thiomethacrylate.

Also contemplated are copolymers of compounds of the above formula with comonomers which contain an ethylenic linkage. Illustrative of the said comonomers which contain an ethylenic linkage are ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, sulfonated styrenes, halogenated styrenes, acrylic acid and alkyl esters thereof, methacrylic acid and alkyl esters thereof, alpha-chloro acrylic acid and alkyl esters thereof, methacrylonitrile, vinyl carbazole, vinyl pyrrolidone, vinyl pyridine, vinyl alkyl ethers, vinyl alkyl ketones, butadiene, fluorinated butadienes, chloroprene, fluoroprene, isoprene, and the like. Especially useful to form soil-repellent finishes are copolymers of esters of acrylic and methacrylic acids derived from alcohols containing from about 1 to about 16 carbon atoms, such as lauryl methacrylate, octyl methacrylate, hexyl acrylate, ethyl acrylate, 2-ethylhexyl acrylate, and the like.

Since the novel fluoropolymers and copolymers find substantial use as textile finishes, it is an advantage to include in the monomer mixture from about 0.2 to about 5% by weight of a reactive acrylic, which permits crosslinking either by heat or crosslinking agents. Such reactive fluorocopolymers give textile finishes with superior resistance to washing, dry cleaning, scrubbing, abrasion and crushing, both wet and dry, and also a better durability of the oil and water repellency.

Illustrative of such reactive comonomers are those derivatives of acrylic or methacrylic acid exhibiting a moiety which, as a pendant group on the resultant interpolymer, is capable of reacting with another compound so as to effect crosslinking. Such groups are well known and many be hydroxy as in the case of a hydroxyalkyl acrylate, carboxy as in the case of acrylic or methacrylic acid, epoxy as in the case of glycidyl methacrylate, methylolamido as in the case of N-methylolacrylamide or alkoxymethylamido as in the case of an etherified methylolacrylamide. Also useful are acrylamide and methacrylamide.

The starting materials useful for making the new polymers of this invention may be prepared from generally available materials or materials which can easily be prepared by procedures within the capabilities of those skilled in the art.

The following reactions outlined in the following sequence show typical methods of preparing the monomers from which the polymers of the present invention are made:

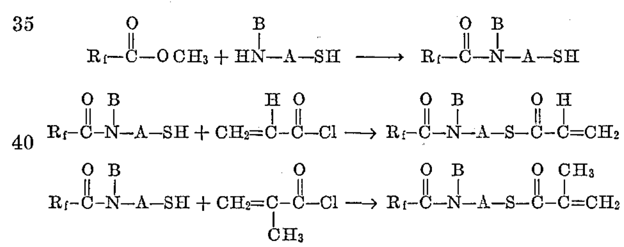

wherein the symbols $R_f$, A, and B have the same meanings given hereinabove.

It is to be understood that the perfluoroalkyl group may be of varying chain length since basic starting materials are often obtained by telomerization procedures yielding $R_f$ groups of varying length.

Homopolymers and copolymers are formed by standard procedures well known to those skilled in the art. Polymerization occurs readily by bulk, solution or emulsion techniques, employing free radical-forming catalysts. The ratios of percentages by weight of the respective monomers used can vary widely in the formation of useful copolymers. For example, charge ratios of the new monomers of the present invention may vary from 1 to 99% by weight of the total monomer mixture. It is preferred however, for the best balance of economy and ultimate properties in soil repellent fabrics, to use between about 40 and about 90% by weight of the instant monomers based on the total monomer mixture.

The copolymers broadly contemplated can have at least three structural variations: they can be homogeneous copolymers; or they can exist in the form of segmented (or heterogeneous) copolymers; or they can comprise physical blends of homopolymers of the present invention, or copolymers blended with a non-fluorine containing homo- or co-polymer thereof. The term "copolymer" used herein broadly contemplates these abovementioned variations, as well as all copolymers obvious to those skilled in the art.

In general all polymerization techniques and procedures as to kind and amount of catalyst, emulsifiers, chain regulators, solvents, and the like are well within the capabilities of those skilled in the art to which this invention pertains.

Films of the homopolymers and copolymers can be prepared either by casting from solvent solutions or from aqueous emulsions. Especially useful as solvents are fluorinated liquids, and special mention is made of $\alpha,\alpha,\alpha$-trifluorotoluene, also known as benzotrifluoride, hexafluoroxylene and mixtures of these with ethyl acetate or acetone and the like.

It is also uniquely advantageous, especially in the preparation of fabric finishes, to use blends of emulsions of the instant fluorinated homopolymers with emulsions of other homopolymers such as polyalkyl acrylates and polyalkyl methacrylates, illustrative of which is poly n-octyl methacrylate. For example, from about 20 to about 97% by weight of a homopolymer such as poly n-octyl methacrylate blended with the polymers of this invention provides useful compositions which, surprisingly, retain high repellency ratings even though the relative amount of polymer of the instant monomers is quite low.

The following examples describing certain representative embodiments of this invention will serve to further illustrate the nature of this invention. It is to be understood that the examples are merely illustrative and intended to enable those skilled in the art to practice the invention in all of the embodiments flowing therefrom and do not in any way limit the scope of the invention defined in the claims.

EXAMPLE 1

2-(n-perfluorooctanoamido)ethyl thiomethacrylate (A) 2-(n - perfluorooctanoamido)ethyl mercaptan.—Methyl perfluorooctanoate (23.54 g., 0.055 mole) is added dropwise to a stirred solution of mercaptoethylamine (8.6 g., 0.11 mole) in 50 ml. of methanol. The mixture is stirred for seven minutes and then poured in 200 ml. of water. The solid product is filtered and crystallized from Freon 113 to yield 19.2 g. of 2-(n-perfluorooctanoamido) ethyl mercaptan, M.P. 85–87° C.

The infrared spectrum shows the amide carbonyl obsorption at 1720 cm.$^{-1}$ and the NH at 3350 cm.$^{-1}$. The NMR spectrum in $CD_2COCD_3$ (vs. tetramethylsilane) shows a quartet at 2.8$\delta$ (S-methylene), a quartet at 3.6$\delta$ (N-methylene) and a broad singlet at 8.5$\delta$ (NH and SH).

*Analysis.*—Calcd. for $C_{10}H_6F_{15}HOS$: C, 25.37; H, 1.27; F, 60.22; N, 2.81; S, 6.77. Found: C, 25.09; H, 1.57; F, 61.47; N, 3.24; S, 6.83.

(B) 2-(n-perfluorooctanoamido)ethyl thiomethacrylate.—A mixture of 2-(n-perfluorooctanoamido)ethyl mercaptan (0.053 mole) and methacrylic chloride (0.053 mole) in 170 ml. of spectrograde methylene chloride (0.053 mole) in 170 ml. of spectrograde methylene chloride is cooled to −15° C. A solution of pyridine (0.055 mole) in 50 ml. of methylene chloride is next added dropwise at such a rate that the temperature of the reaction mixture never rises above −10° C., a trace of iodine being added as a polymerization inhibitor. The reaction is carried out under nitrogen. After the addition is completed, the mixture is allowed to warm slowly to 10° C. and then filtered. Volatile material is removed from the filtrate by distillation under reduced pressure and the residue is extracted several times with hot petroleum ether. The petroleum ether extracts are placed in a refrigerator and the 2-(n-perfluorooctanoamido)ethyl thiomethacrylate precipitate is filtered and dried. The yield is 11.8 g., M.P. 53.5–56° C.

The solid residue from the petroleum ether extraction is treated with water and extracted with chloroform. The chloroform layer separates, and the solvents are removed by vacuum distillation and the residue crystallized from petroleum ether. An additional 5.2 g. of product is obtained.

The NMR spectrum in $CD_2COCD_3$ (vs. tetramethylsilane) shows a doublet at 1.99$\delta$ ($CH_3$), a multiplet at 3.2$\delta$ (S-methylene), a quartet at 3.6$\delta$ (N-methylene), a quartet at 5.69$\delta$ (vinyl cis to methyl), a quartet at 6.12$\delta$ (vinyl trans to methyl) and a broad singlet at 7.2$\delta$ for the NH proton. Analysis shows 2.81% of N (2.58 calculated).

EXAMPLE 2

2-(pentafluoropropionamido)ethyl thiomethacrylate (A) 2-(pentafluoropropionamido)ethyl mercaptan.—This compound is prepared from the ethyl pentafluoropropionate and mercaptoethylamine by a procedure analogous to that of Example 1. In the present procedure, the liquid product is extracted from the water solution with chloroform and purified by distillation under reduced pressure. The yield of the distilled product is 80%; B.P. 1033 C. at 15 mm. of pressure.

(B) 2 - (pentafluoropropionamido)ethyl thiomethacrylate.—2 - (pentafluoropropionamido)ethyl mercaptan, methacrylic chloride and pyridine are reacted according to the procedure of Example 1 except that the reaction mixture is worked up by pouring it in water and extracting the liquid product with chloroform. Distillation of the crude product gives 2-(pentafluoropropionamido)ethyl thiomethacrylate in 57% yield, B.P. 93° C. at 0.015 mm. of pressure.

EXAMPLE 3

2- n-heptafluorobutyroamido)ethyl thiomethacrylate (A) 2 - (n-heptabutyroamido)ethyl mercaptan.—This compound is prepared from methyl heptafluorobutyrate and mercaptoethylamine using the same procedure as in Examples 1 and 2. Yield 63%—B.P. 105° C. at 13 mm. of pressure.

(B) 2 - (n-heptafluorobutyroamido)ethyl thiomethacrylate.—2 - (n-heptafluorobutyroamido)ethyl mercaptan, methacrylate chloride and pyridine are reacted according to the procedure of Examples 1 and 2. The yield of distilled product was 49%—B.P. 99° C. at 0.02 mm. of pressure.

EXAMPLE 4

The procedure of the foregoing examples is repeated employing stoichiometrically equivalent amounts of corresponding starting materials. The following compounds are thus obtained.

$$R_f-\overset{\overset{\displaystyle O}{\|}}{C}-\overset{\overset{\displaystyle B}{|}}{N}-A-S-\overset{\overset{\displaystyle O}{\|}}{C}-\underset{\underset{\displaystyle X}{|}}{C}=CH_2$$

| $R_f$ | B | A | X |
|---|---|---|---|
| $CF_3$ | H | $(CH_2)_6$ | $CH_3$ |
| $(CF_3)_2CF$ | $CH_3$ | $(CH_2)_3$ | H |
| $CF_3(CF_2)_6$ | $CH_2(CH_2)_3$ | $(CH_2)_2$ | $CH_3$ |
| $CF_3(CF_2)_{17}$ | H | $(CH_2)_2$ | $CH_3$ |
| $CF_3(CF_2)_{11}$ | H | $(CH_2)_2$ | $CH_3$ |
| $CF_3(CF_2)_{10}$ | H | $(CH_2)_4$ | H |
| $CF_3(CF_2)_{10}$ | $CH_3$ | $(BH_2)_2$ | H |
| $CF_3(CF_2)_6$ | $CH_3CH_3$ | $(CH_2)_2$ | H |
| $(CF_3)_2CF(CF_2)_6$ | H | $(CH_2)_2$ | $CH_3$ |
| $(CF_3)_2CF[CF_2CF(CF_3)]_4$ | H | $(CH_2)_2$ | H |
| $CF_3[CF_2CF(CF_3)]_5$ | H | $(CH_2)_2$ | $CH_3$ |

EXAMPLE 5

Homopolymers of 2-(n-perfluorooctanoamido)ethyl thiomethacrylate

2 - (n-perfluorooctanoamido)ethyl thiomethacrylate 10 g., and 0.2 g. of azobisisobutyronitrile are dissolved in 10 g. of benzotrifluoride and the solution is sealed in an ampul under nitrogen. After polymerizing at 80° C. for 15 hours, the ampul is opened and the polymer solution is diluted with 30 g. of benzotrifluoride and precipitated by pouring the polymer solution dropwise, with vigorous stirring into 1000 ml. of hexane. The polymer is collected by filtration and is dried. The polymer obtained has the following properties:

*Appearance.*—White, brittle powder.

*Differential thermal analysis.*—Second order transition temperature (Tg.) 68–75° C. First order transition temperature (M.P.) indistinct.

*Microheating stage.*—Melts from 120–124° C.

*Elemental analysis.*—Theory: C, 31.06; H, 1.86; F, 52.65. Found: C, 31.07; H, 2.03; F, 53.59.

This homopolymer is dissolved in benzotrifluoride to provide a 2% by weight solution and the solution is then applied to cotton and wool fabrics. With 2% by weight of the polymer on the fabric, the oil-and-water repellency are evaluated by the 3-M-Oil test and by the AATCC Water Spray test, respectively. The following repellency ratings are obtained with 2% polymer on the fabrics:

| Fabrics | 3-M-Oil Test* | AATCC Water Spray Test* |
|---|---|---|
| Cotton | 130 | 90 |
| Wool | 130 | 90 |

The AATCC water spray test rating was determined according to Standard Test method 22-1966 of the American Association of Textile Chemists and Colorists, XXXVII, 1961, p. 1952 (also designated ASTM-D 583-58).

The free surface energy *c* of a polymer fiber, formed on a glass surface by evaporation of the solvent, is 9 dynes/cm. determined with n-alkanes as wetting liquids.

Oil repellency is measured by the 3-M-Oil test procedure of Grajek and Peterson, Textile Research Journal, April 1962, p. 323.

EXAMPLE 6

Copolymers of 2-(n-perfluorooctanoamido)ethyl thiomethacrylate and n-octylmethacrylate Copolymers of 2-(n-perfluorooctanoamido)ethyl thiomethacrylate and n-octylmethacrylate are prepared as follows. 10 parts by weight of the monomers mixture and 0.2 part of azobisisobutyronitrile are dissolved in 10 parts of benzotrifluoride. The solutions are sealed in an ampul under nitrogen and polymerized for 15 hours at 80°. The ampul is opened, the viscous polymer solution diluted with 30 parts of trifluorotoluene and precipitated into 1000 parts of methanol. The dried copolymers are analyzed by C and H analysis so that the copolymer composition can be determined. 2% by weight of the copolymers, from a 2% solution in benzotrifluoride, is applied to cotton and wool as described in Example 5 and the following repellency ratings are obtained.

| Copolymer composition | | Repellency ratings, 2% polymer on fabric | | |
|---|---|---|---|---|
| 2-(n-perfluoro-octano-amido) ethyl thio-methacrylate, percent by weight | n-Octylmethacrylate, percent by weight | Fabric | 3-M-Oil test | AATCC water spray test |
| 100 | 0 | Cotton | 130 | 90 |
| | | Wool | 130 | 90 |
| 91.7 | 8.3 | Cotton | 110 | 90 |
| | | Wool | 110 | 90 |
| 85.2 | 14.8 | Cotton | 100 | 90 |
| | | Wool | 100 | 80 |

Copolymers with soil repellent properties are obtained by polymerizing 3 parts by weight of 2-(n-perfluorooctanoamido) ethyl thiomethacrylate monomer with one part by weight based on the thiomethacrylate of the following monomers: vinyl acetate, vinyl chloride, vinyl fluoride, acrylonitrile, vinylidene chloride, styrene, hexyl acrylate, 2-ethylhexyl acrylate, lauryl methacrylate, methacrylonitrile, vinyl butyrate, vinyl laurate, butadiene, chloroprene, isoprene.

Fabrics treated with 0.5 and 2% by weight of these copolymers have enhanced oil and water repellency.

EXAMPLE 7

Copolymers of 2-(n-perfluorooctanoamido)ethyl thiomethacrylate and reactive acrylates and methacrylates Copolymers of 98 parts by weight of 2-(n-perfluorooctanoamido)ethyl thiomethacrylate and 2 parts of the following reactive monomers are prepared as described in Example 6 and evaluated: acrylic acid, methacrylic acid, acrylamide, methacrylamide, N - methylolacrylamide, 2-hydroxyethylmethacrylate, 3 - hydroxypropyl acrylate, 2-hydroxypropylmethacrylate, glycidylmethacrylate.

Oil and water repellency results are substantially the same as those described in Example 5.

EXAMPLE 8

Blends of poly-2-(n-perfluorooctanoamido)ethyl thiomethacrylate and poly-n-octylmethacrylate A 2% by weight solution of poly-2-(n-perfluorooctanoamido)ethyl thiomethacrylate and a 2% by weight solution of poly-n-octylmethacrylate were blended in different ratios and applied to cotton and wool. The following repellency ratings were obtained.

| Composition of polymer blend | | Repellency ratings, 2% polymer on fabric | | |
|---|---|---|---|---|
| Poly-2-(n-perfluoro-octanoamido) ethyl-thiomethacrylate, percent by weight | Poly-n-octyl methacrylate, percent by weight | Fabric | 3-M-Oil test | AATCC water spray test |
| 100 | 0 | Cotton | 130 | 90 |
| | | Wool | 130 | 90 |
| 60 | 40 | Cotton | 120 | 90 |
| | | Wool | 120 | 90 |
| 40 | 60 | Cotton | 120 | 90 |
| | | Wool | 120 | 80 |
| 20 | 80 | Cotton | 110 | 90 |
| | | Wool | 120 | 80 |
| 10 | 90 | Cotton | 90 | 80 |
| | | Wool | 110 | 80 |
| 5 | 95 | Cotton | 80 | 70 |
| | | Wool | 110 | 90 |
| 2.5 | 97.5 | Cotton | 0 | 70 |
| | | Wool | 60 | 70 |

EXAMPLE 9

Homopolymer of 2 - (n-pentafluoropropionamido)ethylthiomethacrylate

Homopolymers of 2-(n-pentafluoropropionamido)ethylthiomethacrylate 10 g. and 0.2 g. of azobisisobutyronitrile are dissolved in 20 g. of ethylacetate and the solution is sealed in an ampul under nitrogen. After polymerizing at 80° C. for 15 hours the ampul is opened and the polymer solution is diluted with 20 g. of ethylacetate and precipitated by pouring the polymer solution dropwise with vigorous stirring into 1000 ml. of hexane. The polymer is collected by filtration and dried. The polymer has the following properties:

*Appearance.*—White, brittle powder.

*Differential thermal analysis.*—Tg. 63–68° C., M.P. 80–100° C.

*Microheating stage.*—Melts from 105–108° C.

*Elemental analysis.*—Theory: C, 37.11; H, 3.46; F, 32.62. Found: C, 37.59; H, 3.60; F, 33.38.

EXAMPLE 10

Homopolymer of 2-(n-heptafluorobutyroamido)ethyl thiomethacrylate 2-(n-heptafluorobutyroamido)ethyl thiomethacrylate is polymerized and worked up according to Example 8. The polymer obtained has the following properties:

*Appearance.*—White, brittle powder.

*Differential thermal analysis.*—Tg. 59–61° C., M.P. 76–104° C.

*Microheating stage.*—Melts from 103–108° C.

*Elemental analysis.*—Theory: C, 35.19; H, 2.95; F, 38.97. Found: C, 35.49; H, 2.91; F, 39.17.

This polymer is dissolved in ethylacetate to provide a

2% by weight solution and the solution is applied to cotton with the following repellency obtained:

| Fabric | 3-M-Oil test | AATCC water spray test |
|---|---|---|
| Cotton | −60 | 50 |

While the invention has been explained by detailed description of certain specific embodiments, it is understood that various modifications and substitutions can be made in any of them within the scope of the appended claims which are intended also to include equivalents of such embodiments.

What is claimed is:

1. A normally solid polymer of the monomer compound of the formula:

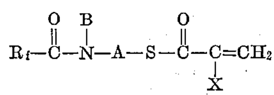

wherein $R_f$ is a perfluorinated alkyl of 2 to 18 carbon atoms;
A is an alkylene radical of 2 to 6 carbon atoms;
B is hydrogen, or alkyl of 1 to 4 carbon atoms; and
X is hydrogen, or methyl;

which is a homopolymer of said monomer or a copolymer of said monomer and a copolymer selected from ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, sulfonated styrenes, halogenated styrenes, acrylic acid and alkyl esters thereof, methacrylic acid and alkyl esters thereof, alpha-chloro acrylic acid and alkyl esters thereof, methacrylonitrile, vinyl carbazole, vinyl pyrrolidone, vinyl pyridine, vinyl alkyl ethers, vinyl alkyl ketones, butadiene, fluorinated butadiene, chloroprene, fluoroprene, or isoprene.

2. A polymer as claimed in claim 1 wherein X is hydrogen.

3. A polymer as claimed in claim 1 wherein X is methyl.

4. A polymer as claimed in claim 1 wherein $R_f$ is a perfluorinated alkyl of 6–10 carbon atoms.

5. A polymer as claimed in claim 1 wherein B is hydrogen.

6. A polymer as claimed in claim 1 wherein A is ethylene.

7. A polymer as claimed in claim 1 which is a homopolymer of 2-(n-perfluorooctanoamido)ethyl thiomethacrylate.

8. A polymer as claimed in claim 1 which is a homopolymer of 2-(n-perfluorooctanoamido)ethyl thiomethacrylate.

9. A polymer as claimed in claim 1 which is a homopolymer of 2-(n-heptafluorobutyroamido)ethyl thiomethacrylate.

10. A copolymer of 2-(n-perfluorooctanoamido)ethyl thiomethacrylate and n-octyl methacrylate.

11. A polymer of claim 1 which is the homopolymer.

12. A composition of matter comprising a blend of a copolymer claimed in claim 14 and a second copolymer which is a poly(alkyl acrylate) or a poly(alkyl methacrylate).

13. A composition of matter comprising the copolymer as claimed in claim 10 and second copolymer which is a poly(alkyl acrylate) or a poly(alkyl methacrylate).

14. A normally solid polymer as claimed in claim 1 which is a copolymer of the monomer compound defined in claim 1 and a copolymer selected from ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, sulfonated styrenes, halogenated styrenes, acrylic acid and alkyl esters thereof, methacrylic acid and alkyl esters thereof, alpha-chloro acrylic acid and alkyl esters thereof, methacrylonitrile, vinyl carbazole, vinyl pyrrolidone, vinyl pyridine, vinyl alkyl ethers, vinyl alkyl ketones, butadiene, fluorinated butadienes, chloroprene, fluoroprene, or isoprene.

15. A fabric comprising cotton or wool to which there has been applied a polymer as claimed in claim 1 whereby said fabric is rendered repellent to oil and water.

16. A fabric comprising cotton or wool to which there has been applied a polymer as claimed in claim 7 whereby said fabric is rendered repellent to oil and water.

17. A fabric comprising cotton or wool to which there has been applied a copolymer as claimed in claim 14 whereby said fabric is rendered repellent to oil and water.

18. A fabric comprising cotton or wool to which there has been applied a copolymer as claimed in claim 10 whereby said fabric is rendered repellent to oil and water.

19. A fabric comprising cotton or wool to which there has been applied a homopolymer as claimed in claim 11 whereby said fabric is rendered repellent to oil and water.

20. A fabric comprising cotton or wool to which there has been applied a composition of matter as claimed in claim 12 whereby said fabric is rendered repellent to oil and water.

21. A fabric comprising cotton or wool to which there has been applied a composition of matter as claimed in claim 13 whereby said fabric is rendered repellent to oil and water.

References Cited

UNITED STATES PATENTS

| | | | |
|---|---|---|---|
| 2,642,416 | 6/1953 | Ahlbrecht et al. | 260—900 |
| 3,277,063 | 10/1966 | Harris | 260—79.7 |
| 3,403,122 | 9/1968 | Sherman et al. | 260—79.7 |

JAMES A. SEIDLECK, Primary Examiner

U.S. Cl. X.R.

117—155, 142, 132, 148, 139.5, 135.5; 260—79.7, 898, 63, 897, 79.3, 890, 78.5.